(12) United States Patent
Bodor et al.

(10) Patent No.: US 6,217,917 B1
(45) Date of Patent: *Apr. 17, 2001

(54) METHOD OF PREPARING A DAIRY SPREAD

(75) Inventors: Janos Bodor; Jan Kuiper; Adrianus Marinus Ledeboer; Marinus Theodorus Pleijsier; Jan Cornelis De Smit; Yvon Maria Ijsseldijk; Robert Vreeker, all of Vlaardingen (NL)

(73) Assignee: Lipton, a division of Conopco, New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/170,918

(22) Filed: Oct. 13, 1998

(30) Foreign Application Priority Data

Oct. 13, 1997 (EP) .................................................. 97203184

(51) Int. Cl.⁷ .................................................. A23C 9/127
(52) U.S. Cl. ................................ 426/43; 426/34; 426/36; 426/582
(58) Field of Search .................................. 426/34, 36, 39, 426/42, 43, 61, 582, 580, 583

(56) References Cited

U.S. PATENT DOCUMENTS

| | | | |
|---|---|---|---|
| 4,228,190 | * 10/1980 | Wallgren et al. | 426/421 |
| 4,243,684 | 1/1981 | Pruss et al. | 426/40 |
| 4,732,769 | 3/1988 | Sozzi et al. | 426/40 |

FOREIGN PATENT DOCUMENTS

| | | |
|---|---|---|
| 0082581 | 6/1983 | (EP) . |
| 2154371 | of 0000 | (FR) . |
| 92/02142 | 2/1992 | (WO) . |
| 94/12656 | 6/1994 | (WO) . |

OTHER PUBLICATIONS

Robijn et al. *Carbohydrate Research*, vol. 276, 1995, p. 137–154.*

Perry D. B. et al.: "Effect of Exopolysaccharide–Producing Cultures on Moisture Retention in Low Fat Mozzarella Cheese", Journal of Dairy Science, vol. 80, No. 5, May 1997, pp. 799–805.

European Search Report and Annex, Application No. EP 97,20,3184 completed Feb. 23, 1998.

Sabastiani H: "Neues Von Den Rotholzer Kulturen", DMZ. Lebensmittelindustrie Und Milchwissenschaft, vol. 115, No. 12, Jun. 9, 1994, p. 586 (not translated).

* cited by examiner

Primary Examiner—Keith Hendricks
(74) Attorney, Agent, or Firm—Milton L. Honig

(57) ABSTRACT

Dairy spreads, especially fresh cheese, are sensitive for heat treatments. The heat treated products are often grainy, mealy and chalky. The invention relates to a method of producing a dairy spread wherein a cheese milk or cream or a combination thereof is acid coagulated in the presence of a suitable culture, wherein the culture comprises an exopolysaccharide producing lactic acid bacterium capable of reducing the graininess of the heat treated dairy spread.

11 Claims, 5 Drawing Sheets

Fig. 1.
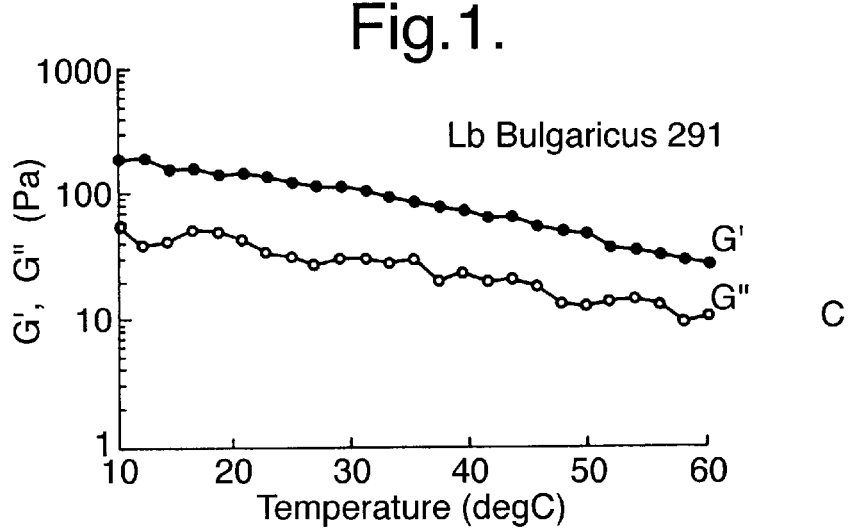
C
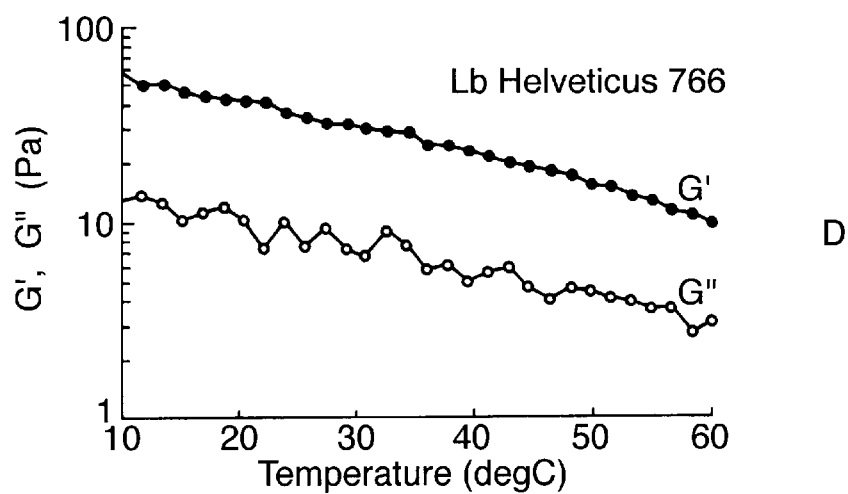
D
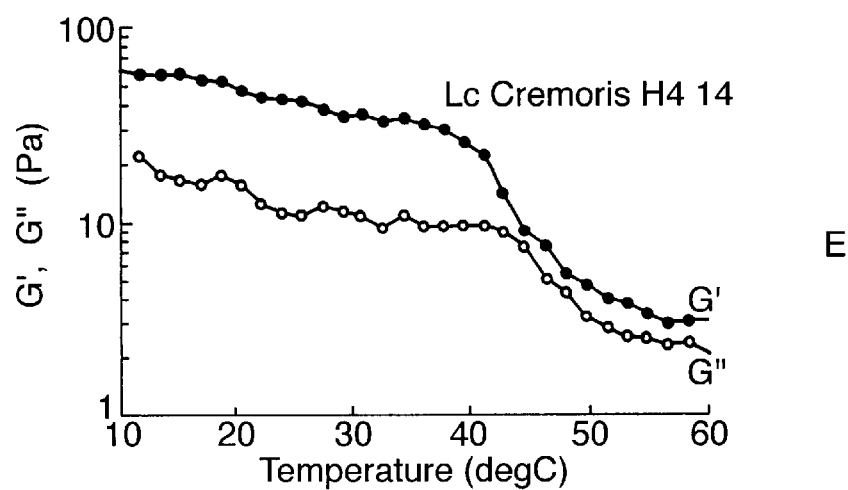
E

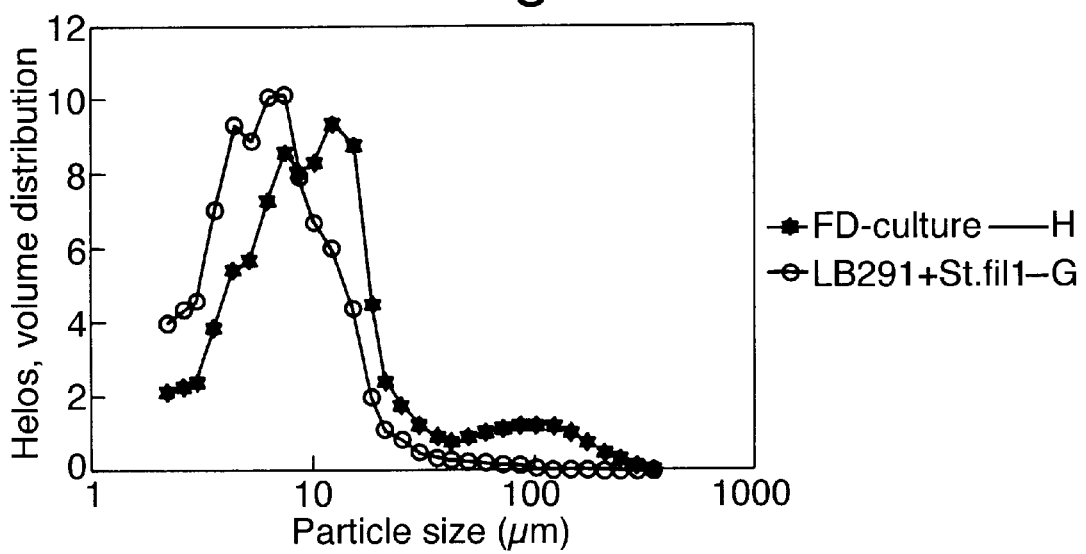

Image width 65 μm

Image width 65 μm

Image width 65 μm

METHOD OF PREPARING A DAIRY SPREAD

The invention relates to dairy spreads and a method of their preparation.

For the purpose of the invention dairy spreads are spreads comprising acidified milk based products. Dairy spreads are generally made of a suitable mixture of concentrated milk protein and fat sources, which are acidified and further processed with optional whey removal. Examples of dairy spreads are spreadable butter, yoghurt spreads, margarines containing acidified dairy ingredients, fresh cheese, cottage cheese, quark and cream cheese.

Preferred products are fresh cheese or other spreadable products containing at least 5 wt % fresh cheese.

For the purpose of the invention the expression spread is intended to mean a plastic, spreadable product which can be applied onto bread at room temperature without substantially tearing the bread.

Dairy spreads can for example be produced as follows: milk or cream is standardised to the desired fat and protein content and is acidified, e.g. by means of a starter culture and optionally heated. When the pH approaches the iso-electric point of casein (about 4.6), protein coagulates, whereby the spread is formed. Whey removal and homogenisation during or after coagulation are optional processing steps.

The fat in the dairy spread can be of milk or non-milk origin, and (part of) the fat may be added after acidification.

Optionally further ingredients may be included at an appropriate stage e.g. butter, cream, herbs, spices, salt, binding and/or structuring agents. If coagulation is caused to occur by the combined action of acid and heat, the pH at coagulation can be substantially higher than 4.6.

Fresh cheese is distinguished from other cheeses in that coagulation of milk proteins is caused to occur by the action of acid e.g. formed by a starter culture, and optionally also heat, rather than by an enzyme such as rennet, and in that the fresh cheese is not matured but is ready for consumption once the manufacturing operations are complete. In the preparation of fresh cheese rennet may be employed, but in relatively small amounts as an auxiliary ingredient with respect to acidifying ingredients. In this role it is believed to serve for improving the resulting product properties and improving the efficiency of the coagulation process. The primary factor causing coagulation however is acid optionally in combination with heat.

In the case of the production of fresh cheese, generally whey is removed after coagulation and subsequent to, during, or before whey removal, a heating and or homogenisation step may be included.

After the manufacture of a dairy spread, usually it is hot or cold filled into moulds or packages, allowed to cool down and stored at chill temperatures. If required the dairy spread can be removed from the moulds or package after sufficient rigidity is obtained by cooling.

A problem in the preparation of dairy spreads is the occurrence of less favourable textures. For example dairy spreads are often grainy, mealy, and chalky. This less favoured texture is especially observed when during the preparation process a heat treatment is applied.

For the purpose of the invention, a heat treatment is defined as heating the dairy spread to a temperature above 58° C. for a period of more than 1 second.

Generally heating may for example be applied to lengthen the shelf-life of the products by inactivating lactic acid bacteria, which otherwise would cause further acidification of the products during subsequent storage.

During this heating step considerable further aggregation of milk proteins may take place, resulting in possible mouthfeel defects: a grainy, gritty, mealy, chalky mouthfeel is the result. Homogenisation may then be applied to modify the texture, particularly the mouthfeel, but very often the results are not satisfying and the product remains grainy or mealy. A grainy, mealy or chalky mouthfeel is generally not appreciated by the consumer. Therefore there is a need to find ways to improve the mouthfeel of dairy spreads, especially of dairy spreads which have been heated during the preparation.

Previously it has been suggested to add stabilisers such as carob, guar gum, gelatin, starch and the like to the dairy spread to improve its quality. However the use of such ingredients is generally not preferred by the consumer.

It is an object of the invention to provide a selection of natural ingredients which can be added to the dairy spread mix to reduce the sandiness or graininess even if a heat-treatment is applied. Surprisingly it has been found that specific exopolysaccharide producing bacteria can advantageously be incorporated.

The general incorporation of bacteria in dairy products has been described in the literature.

For instance EP-A-111,020 describes the use of a specific combination of bacteria to produce a thick fermented milk product.

EP-A-639,332 describes a method for the manufacture of reduced fat cheddar cheese. A culture system is used comprising a ropy culture. Cheddar is a cheese product which is not spreadable. In the process of preparing the cheddar, cheese milk is acidified by a starter culture for 30 minutes and subsequently ripened for 30 minutes in the presence of rennet.

EP-A-196,436 describes the use of a mixture of various *Streptococcus cremoris* bacteria in the manufacture of quark. No heat treatment or homogenisation step is applied to the quark mix.

EP-A-331,564 describes the use of a polysaccharide from a specific *Streptococcus thermophilus* culture as a thickener for example for the production of yoghurt.

U.S. Pat. No. 4,243,684 aims to reduce the sandiness in soft cheese such as Camembert, Brie, Romadur, Limburger and Muenster by using specific ropy cultures. In these products, coagulation is primarily effected by the action of rennet. No heat treatment is applied after coagulation. In the dairy spreads according to the invention, coagulation is effected primarily by acidification.

WO-A-94/12656 describes specific *Lactobacillus sake* strains which have the capability of producing exopolysaccharides in products such as margarines and dressings.

FR-A-2,154,371 relates to fresh cheese products such as yoghurt that are acidified to a certain pH and subsequently consumed. As said products are not heat-treated after coagulation, said products highly likely comprise living active lactic acid bacteria.

WO-A-92/02142 discloses novel donor bacteria harboring a plasmid DNA fragment, encoding for a substance which increases viscosity of a milk-containing product. Said bacteria may be used for the production of buttermilk, sour cream and cottage cheese. Said products are believed to comprise live bacteria as no heat treatment is applied after acidification.

EP-A-82581 relates to fermented milk products, e.g. yoghurt, comprising specific lactic acid bacteria, interconnected by threads of biopolymers. Said products are allowed to ferment and the resulting product is then ready for consumption.

Sebastiani, H (DMZ Lebensmittel Industrie und Milchwissenschaft, vol. 115, no. 12, Jun. 9, 1994, page 586)

discloses the use of Streptococcus thermophilus strains in the production of exopolysaccharides. Said strains are said to be applicable for fermentation of acidified milk products and soft cheese.

Obert, G (Magyar Tejgazdasag Kiserleti Intezet, Pecs, Hungary. Tejipar. Vol 33, No. 2, p. 47–48, 1984) discloses the preparation of a cream turo by using a heat resistant, slime producing strain of Streptococcus thermophilus which allegedly improves Theological properties. Said products are packaged at 60° C., without killing said slime producing bacteria.

In neither of the above cases the specific problem of the smoothness of products comprising an acid casein network, and that have been heat-treated, has been discussed.

Surprisingly it has now been found that specific exopolysaccharide producing lactic acid bacteria can advantageously be used in the production of heat-treated dairy spreads therewith resulting in non-grainy or non-sandy products.

Even more surprisingly it was found that dairy spreads such as fresh cheese, produced with exopolysaccharide producing lactic acid bacteria, can be heat treated without losing the homogeneous, non grainy or non sandy product appearance and texture.

Accordingly in a first aspect, the invention relates to a method of producing a dairy spread wherein a cheese milk or cream or a combination thereof is acid coagulated in the presence of a suitable culture and subsequently subjected to a heat treatment, and wherein said culture comprises an exopolysaccharide producing lactic acid bacterium capable of reducing the graininess of the dairy spread.

The acid coagulation can optionally be followed by whey removal and/or homogenisation, in any order.

In another aspect the invention relates to a method of producing a fresh cheese wherein a cheese milk is acid coagulated in the presence of a suitable culture, followed by whey separation and heat-treatment, in any order, wherein the culture comprises an exopolysaccharide producing lactic acid bacterium capable of reducing the graininess of the fresh cheese.

The suitable culture for use in a product of the invention comprises an exopolysaccharide (EPS) producing lactic acid bacterium capable of reducing the graininess of a dairy spread. Although the EPS producing bacteria may form part of the starter cultures present, in order to contribute to the smooth texture, it is preferred that they are at least a significant part of the starter culture. Other cultures can be added to the EPS bacteria, for example to increase the acidification rate of the dairy spread mixture or to contribute to the final taste of the product.

For the purpose of the invention not all EPS producing lactic acid bacteria have been found capable of reducing the graininess of the heat treated dairy spread. However applicants are of the opinion that it is well within the capability of the skilled person to determine which EPS producing lactic acid bacteria are suitable, based on the following guidelines.

A first, probably most suitable test (a) for determining the capability to reduce graininess is to produce a dairy spread, for example fresh cheese, by a standard method of preparation using an EPS producing lactic acid bacterium and compare the graininess of the product with a product produced by the same method (i.e. same acidification conditions) but acidified in the presence of a non-EPS producing lactic acid bacterium. This test is preferably done with a low fat dairy spread. A significant reduction in grainy, sandy mouthfeel for the dairy spread whereby an EPS producing lactic acid bacterium was used, compared to products in which a non-EPS producing lactic acid bacterium was used, is indicative of the capability of reducing graininess in heat treated dairy spreads. This method is illustrated in the examples.

Preferably this reduction in graininess in test (a) is determined by a trained panel of consumers. The graininess is then scored on a scale of 1 to 5, whereby 1 is indicative of a smooth, non-grainy sample and 5 is indicative of a very grainy sample like cottage cheese or other more crumbly products. Preferably at least 8 out of ten participants in the tasting session indicate a reduced graininess of at least 2 units on a scale of 1–5, for suitable EPS producing cultures.

Several other tests have also been developed to determine which EPS producing lactic acid bacteria are suitable to reduce graininess in heat treated dairy spreads. A combination of two or more of these tests will show whether the EPS producing lactic acid bacteria are suitable to reduce graininess in heat treated dairy spreads.

A second suitable test (b) to determine the capability to reduce graininess is to produce a dairy spread, for example a fresh cheese and determine the degree of graininess of the product by determining the distribution of the particle size of diluted spread dispersions, whereby graininess is reduced if the amount of particles with higher size is reduced. Preferably the particle size volume distribution is such that less than 10 vol. %, more preferred less than 7 vol. % particles have a size greater than 18 $\mu$m. This method is illustrated in the examples.

The capability of an EPS producing culture to reduce graininess in heat treated dairy spreads can furthermore be determined by screening EPS cultures in milk. A suitable test (c) to determine the capability to reduce graininess is to determine the elastic modulus G' and G" as a function of temperature for milk samples fermented with various EPS producing lactic bacteria. Both G' and G" are very sensitive probes for protein aggregation in these samples.

A sudden change in G' and G", when slowly heating the sample, is indicative for (heat-induced) aggregation of the protein particles. It is our experience that protein aggregate particles formed during heating are the major cause for graininess in dairy spreads. From the variation of G' and G" with temperature one may thus deduce the ability of an EPS producing culture to prevent protein aggregation during heating, and to reduce graininess in dairy spreads. More specifically, a relatively flat profile of G' and G" over a temperature range from 40° C. up to 60° C. is indicative of the capability of reducing graininess in heat treated dairy spreads.

To determine the change in rheologic parameters via G' and G" quantitatively, the following equation for the reduction in log G' may be used:

Reduction factor=100% * [logG'(40° C.)–logG'(60° C.)]/ log G'(40° C.), with G' in Pa.

In this reduction factor the temperature dependence of log G' is expressed for the temperature range of 40–60° C.

Preferably the reduction factor as defined above is less than 35%, more preferred less than 30%. This method is also illustrated in the examples.

Another suitable test (d) is to determine the water loss from the milk samples fermented with various EPS producing lactic acid bacteria. Samples, prepared with the suitable EPS producing cultures are less heat sensitive. The heat treatment in this test can for example be heating at 80° C. for 1 hour. For suitable cultures preferably the water loss after such a heat treatment at pH around 4 of the product is less than 20 wt %, more preferably no significant water loss (less than 5 wt %) of the milk sample after heat treatment is detected at pH around 4 of the product.

Another suitable test (e) is to determine whether the exopolysaccharide molecules are charged. We have found that the production of uncharged exopolysaccharides is indicative of the capability of the cultures producing the uncharged EPS to reduce the graininess in heat treated dairy spreads. A method to determine charge of EPS molecules is illustrated in the examples.

Another suitable test (f) is to determine whether the EPS produced forms a capsule around the bacteria producing it. This test can for example be carried out by using confocal scanning laser microscopy using a common protein staining agent, for example rhodamine. If the bacteria are surrounded by a layer of EPS, wherein substantially no protein is present, this is indicative of cultures suitable for reducing the graininess in dairy spreads. The layer of EPS around the bacteria is also called a capsule around the bacteria. Accordingly the fact that the bacteria are encapsulated by EPS is indicative that these bacteria may be suitable for reducing the graininess of dairy spreads. Preferably this test (f) is applied to samples which have not been subjected to considerable shear. This test may be less suitable for sheared product because the capsule can be destroyed by shear.

Another suitable test to determine the capability to reduce graininess is to measure the hardness of the dairy spread before and after a pasteurisation step. Usually, the hardness of the product will increase largely, upon application of a pasteurisation treatment. Hardness in the context of the invention is defined as the maximum resistance measured during penetration of the product. Preferably the change in hardness of a product, produced with a suitable EPS producing culture is relatively low, compared to a product in which no EPS culture was used in the production.

A preferred embodiment according to the invention relates to a method of producing a dairy spread wherein a cheese milk or cream or a combination thereof is acid coagulated in the presence of a suitable culture, wherein the culture comprises an exopolysaccharide producing lactic acid bacterium, said lactic acid bacterium producing EPS that is uncharged and forms a capsule around the bacteria.

Applicants have found that particularly suitable EPS producing cultures for use in the present invention are *Lactobacillus delbrueckii* supsp. *bulgaricus* 291 and *Lactobacillus helveticus* NCDO 766.

However, given the above guidelines applicants believe it well within the ability of the skilled person to identify further suitable cultures.

For the purpose of the invention, where ranges are included saying "from (a) to (b)" it is meant to say from and including (a) up to and including (b).

Preferably the final dairy spread has a dry matter content of from 5 to 70 wt %, more preferably from 15 to 65 wt %.

The fat content of the dairy spread is from 0 to 60 wt %, preferably from 0 to 40 wt % fat.

The fat content of the dairy spread product can be up to 80 wt %, preferably from 0 to 75 wt % of the dry weight of the product. Especially good products are obtained if from 10 to 75 wt %, particularly from 40 to 60 wt % of the dry matter of the dairy spread is fat.

Particularly good product improvements are obtained with from 0 to 40 wt % fat and a dry matter content of from 15 to 65 wt %, in combination with a process that includes a homogenisation step.

The preferred fat is milk fat, but instead of all or part of the milk fat, also vegetable fat can be employed. Preferably the products according to the invention comprises at least 30 wt % milk fat on total fat, more preferred at least 60 wt % milk fat on total fat.

Although it is highly preferred to produce a smooth non grainy product by using suitable EPS-producing lactic acid bacteria only, it is possible to include other ingredients such as from 0.1 to 5 wt % binding and/or structuring and/or stabilising agent, an amount of from 0,1 to 3 wt %, especially from 0.3 to 1,5 wt % being particularly preferred; preferred binding or structuring or stabilising agents are whey protein, preferably incorporated in the form of whey protein concentrate, locust bean gum, carboxymethyl cellulose, gelatine and mixtures thereof.

Such binding and/or structuring and/or stabilising agents can be beneficial for getting very good form stability of the dairy product such as fresh cheese at elevated temperature, to obtain a stable product that does not suffer from oil exudation or moisture syneresis. Preferably however the total level of stabilising or binding or structuring ingredients is less than 0.1 wt %, most preferred zero. Preferably the above mentioned optional ingredients are added after acidification of the dairy spread. If whey is separated off, the optional ingredients are preferably added after whey separation.

According to one embodiment the dairy spread is prepared by a process that includes the steps of a. acidifying milk or cream or a combination thereof comprising the exopolysaccharide producing lactic acid bacteria and optionally other acidifying cultures to cause coagulation;

b. applying a heat treatment, optionally removing whey, and optionally incorporating further ingredients, in any order.

c. filling the product in the final package

A preferred process comprises whey removal in step (b), after said heat treatment.

The milk or cream or combination thereof used in step a. can be an ordinary milk or cream standardised to a particular protein and/or fat content according to the desired end product and the process to be applied. The milk can also be reconstituted milk from powdered milk. The milk or cream can include other materials e.g. buttermilk, skim milk, butterfat, vegetable fat etc. The milk or cream may have been pasteurised and/or treated at high temperature and/or homogenised.

The milk or cream is acidified, by means of a starter culture comprising exopolysaccharide producing lactic acid bacteria and optionally a small amount of rennet is included.

Coagulation is preferably caused to occur by the action of acid rather than the combined action of acid and heat; accordingly the acidified milk in which coagulation has occurred preferably has a pH of from 4.5 to 5.0, more preferably from 4.6 to 4.9.

Acidification and coagulation can be stopped by applying the said heat treatment according to step (b) for example above 58° C. for a period of 5 minutes.

Optionally whey is removed, preferably by ultrafiltration (UF) or centrifuging in a separator.

Said heat treatment according to step (b) may serve to obtain increased consistency in the curd and to pasteurise the product. It may be applied before or after the whey removal. The heat treatment to increase consistency may be combined with the heat treatment to stop acidification.

Said heat treatment according to step (b) is preferably carried out at a temperature of above 60° C., preferably 65–100° C., more preferred 70–80° C., most preferred 75–80° C.

It can further be beneficial to subject the curd to a homogenisation, e.g. by passage through a homogeniser.

Homogenisation can be applied while the product is at elevated temperature. Preferably homogenisation takes place in a homogeniser operating e.g. at a pressure of at least 50 bar, preferably 75–500 bar, particularly 100–300 bar.

Optionally, according to another embodiment in step (b), after heat treatment whey is removed, followed by another heat treatment and a homogenisation step.

The composition of the milk or cream and the subsequent processing can be chosen such that the obtained product is suitable for packing without including further ingredients subsequent to step (a) above or with inclusion of only some ingredients for taste, flavour and appearance purposes, e.g. salt, flavour, herbs, spices etc.

Herbs and other materials comprising discrete particles which are to remain discernible as such in the end product are preferably incorporated late in the process, preferably just before the extrusion. If such discrete particles containing materials are to be included, it is for hygienic reasons particularly desired that the product after incorporation of such materials is pasteurised. If so desired materials may be put on the surface of the product, e.g. part or all of the product surface may be supplied with a layer of herbs, pieces of nuts etc.

Ingredients that need not remain discernible as such in the end product, e.g. salt or spices can be incorporated at an earlier stage of the process, but preferably such incorporation is done at a stage after the optional whey removal has taken place.

Similarly, if so desired additional ingredients can be incorporated, e.g. cream, butter, vegetable fat, structuring and/or binding and/or stabilising agents, etc. at several stages in the above process, but preferably after the optional whey removal has taken place.

Products according to the invention can be blended with other food products. Therefore the invention also relates to dairy spreads comprising acidified milk based products prepared according to the invention. Any suitable acidified milk based product can be used. The amount of the acidified product is preferably more than 5 wt %.

The preferred product of the current invention is fresh cheese, which can be consumed as such. It is also possible to blend the fresh cheese product with for example butter, yoghurt, margarine, a spread comprising vegetable fat, cottage cheese, mozzarella, quark, cream cheese, creme fraiche, or clotted cream. The product can be blended homogeneously to obtain a mixed product or inhomogeneously, whereby the fresh cheese component and the other component are combined in a packed dairy spread. The blended products preferably comprise at least 5 wt %, more preferably at least 15 wt %, most preferably at least 50 wt % fresh cheese according to the invention.

The most preferred product according to the invention comprises more than 90 wt % fresh cheese.

Preferably the products according to the invention have a long shelf life stability. Long shelf life stability is defined as having a closed keepability of at least 3 weeks, preferably at least 6 weeks, particularly at least 8 weeks whereby the product does not show increased acidity or taste or texture changes compared to the finished product. Said long shelf life stability can for example be obtained by applying a heat treatment after coagulation at a temperature, high enough and time long enough to kill substantially all bacteria, such that acidification does not continue in the package. Applicants have found that a heat treatment at too low temperature, applied during a short time may not kill all bacteria; on the other hand a heat treatment at too high temperature for a long time may lead to a products with an undesired texture. Therefore, said heat treatment is preferably carried out at a temperature above 60° C., more preferred from 65 to 100° C. most preferred 70–80° C. Said heat treatment lasts preferably from several seconds to 20 minutes, preferably 10 seconds to 15 minutes, particularly from 1 to 5 minutes.

The product according to the invention is preferably substantially free of living lactic acid bacteria. The invention will hereafter be illustrated by non limiting embodiments thereof. Parts and percentages throughout this specification refer to weights unless otherwise indicated.

BRIEF DESCRIPTION OF THE FIGURES

FIG. 1: Depicts the oscillatory shear measurement results of samples C, D, and E, respectively, from Example 11.

FIG. 2: Depicts the particle size distribution from sample G of Example V.

EXAMPLES

General Procedures

Figure 3A:
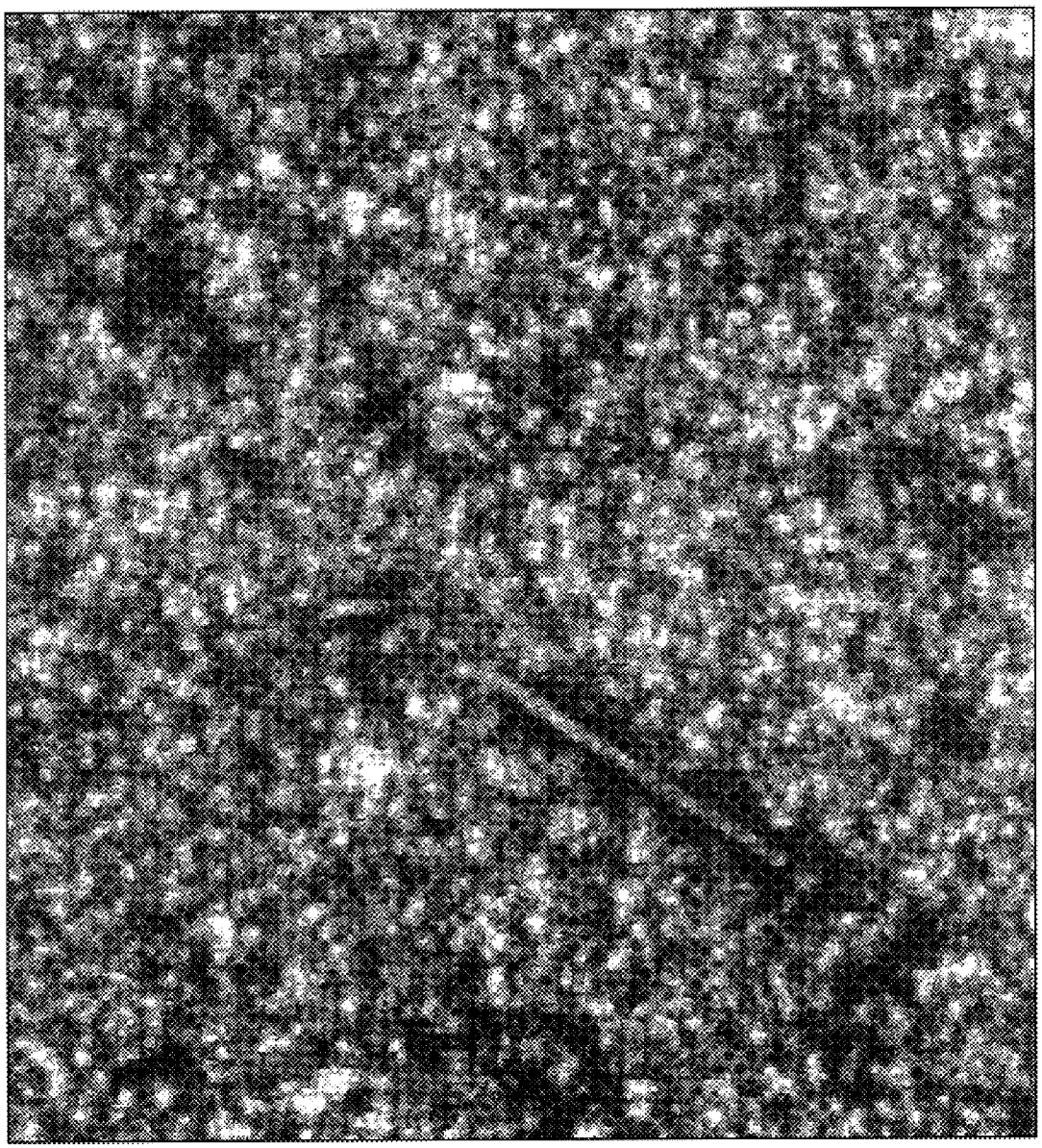
FIGS. 3a, 3b and 3c: Depict CSLM scans of samples C, D and E, respectively, in Example VI B.

In the examples the following standard process of preparing a spreadable fresh cheese is used.

Preparation of the Pre-Culture

Sterile skim milk is inoculated with 0.5% of a culture that has been stored at −80° C., as a full grown culture in skim milk, diluted with sterile 10% glycerol to an end volume of 6% glycerol. The inoculated sterile skim milk (called preculture) is fermented for 16 h at 35° C. for a mesophyllic culture and at 37° C. for a thermophyllic culture.

Preparation of the Fresh Cheese

Raw milk is pasteurised for 30 seconds at 72° C. The milk is then standardised to 2.5 wt % of fat. 1 wt % of the mesophillic or 2.5 wt % of the thermophillic lactic acid pre-culture is added plus 0.001 wt % of rennet. Furthermore 1 wt % of another acidifying culture may be added to increase the acidification rate of the dairy spread mixture, f.e. *Streptococcus thermophilus* filant. The milk is acidified to pH 4.8 at a temperature of 23° C. for a period of circa 16 hours for a mesophyllic culture and at 43° C. for circa 3 h for a thermophyllic culture. The product is then heated for 5 minutes at 60° C. followed by ultrafiltration to remove part of the whey till a dry matter content of 28 wt % on the product has been reached. Then the product is mixed with 0.7 wt % salt and is heat-treated again at 75° C. for 10 minutes. The product is homogenised in a homogeniser operating at 200 bar and filled in tubs. The final product comprises around 10 wt % fat, 13 wt % protein and around 28 wt % dry matter.

The following examples illustrate the methods described above. If test (a) is used to determine the capability of an EPS producing culture to reduce graininess in dairy spreads, a second test is not necessary. Test (a) has been carried out in example I and example IV. If any of tests (b–f) is used, a combination of two or more tests is required to obtain a reliable result. Therefore the results of two tests chosen from examples II, III V and VI should be combined before drawing a final conclusion about capability of an EPS producing culture to reduce graininess in dairy spreads.

Example I

Two fresh cheeses were prepared according to general procedures.

Fresh cheese A was prepared by using 50 parts (1 wt %) *Lactobacillus delbrueckii* supsp. *bulgaricus* 291 and 50 parts (1 wt %) of *Streptococcus thermophilus* filant as the thermophyllic pre- culture. The acidification was carried out at 43° C. until a pH of 4.8 was reached. Fresh cheese B was prepared by using 2.5 wt % *Lactococcus lactis* supsp. *cremoris* H414. The acidification was carried out at 23° C. until a pH of 4.8 was reached.

According to method (a) described above, the products were tasted to assess their graininess. Product A (according to the invention) had a significantly reduced graininess as compared to product B (comparison).

Example II

Three milk samples were prepared as follows:

Sterile skimmed milk was fermented with 1 wt % of a culture. Sample C was fermented at 37° C. with *Lactobacillus delbrueckii* subsp. *bulgaricus* 291 to a pH of 3.8. Sample D was fermented at 37° C. with *Lactobacillus helveticus* NCDO 766 to a pH of 3.7. Sample E was fermented at 20° C. with *Lactococcus lactis* supsp. *cremoris* H414 to a pH of 4.2.

Oscillatory shear measurements (G', G") were performed using a Carrimed CSL 500 rheometer (cone-plate geometry) while increasing the temperature from 10° C. to 60° C. at a rate of 2.5° C./min. The results are shown in FIG. 1. On the X-axis the temperature is plotted (0° C.), and on the Y-axis G'/G" is plotted on a log scale.

For sample C (according to the invention) the graph of G' in Pa against temperature was more or less a flat (smooth) line with G' (at 10° C.) being about 200 Pa and G' at 60° C. being 25.3 Pa. The graph of G" in Pa against temperature also was a more or less flat line with G" at 10° C. being about 50 Pa and G" at 60° C. being about 10 Pa.

These flat G' and G" profiles are indicative of heat stability for the sample.

G'(40° C.)=61.8 Pa

G'(60° C.)=25.3 Pa

Reduction factor=22%

The reduction factor being less than 35%, is indicative of cultures suitable to reduce the graininess of dairy spreads.

For sample D (according to the invention) the graph of G' in Pa against temperature was more or less a flat line with G' at 10° C. being about 50 Pa and G' at 60° C. being about 10 Pa. The graph of G" in Pa against temperature also was a more or less flat line with G" at 10° C. being about 12 Pa and G" at 60° C. being about 3 Pa. Again these flat G' and G" profiles are indicative of heatstability for the sample.

G'(40° C.)=21.2 Pa

G'(60° C.)=9.4 Pa

Reduction factor: 27% The reduction factor being less than 35%, is indicative of cultures suitable to reduce the graininess of dairy spreads.

For sample E (comparison) the graph of G' against temperature showed a distinct downwards bend in the area of between 40° C. and 50° C., with G' at 10° C. being about 50 Pa, at 40° C. being about 25 Pa, at 50° C. being about 3.5 Pa and G' at 60° C. being about 2 Pa. G" at 10° C. was about 20 Pa, at 40° C. about 9 Pa, at 50° C. being about 2 Pa and G' at 60° C. being about 2 Pa.

G'(40° C.)=23.8 Pa

G'(60° C.)=2.9 Pa

Reduction factor=66%.

The reduction factor being higher than 35% is indicative that these cultures are not suitable to reduce graininess in dairy spreads.

According to test (c) suitable exopolysaccharide producing starter cultures for use in the preparation of a dairy spread in accordance to the invention can be selected by measuring the G' and G" profile as indicated above. The reduction factor as defined in the text of this application is preferably less than 30%.

This example indicates that *Lactobacillus delbrueckii* subsp. *bulgaricus* 291 and *Lactobacillus helveticus* NCDO 766 may be suitable cultures to reduce graininess in dairy spreads.

Example III

Sterile skimmed milk was fermented with 1 wt % of a preculture as described in example II samples C–E. Sample F was obtained by inoculating sterile skim milk, supplemented with 0.35% yeast extract, 0.35% peptone, 1% glucose and 50 mg/l $MnSO_4$, with 0.5% of a culture of *Lactobacillus sake* 0-1, that had been stored at –80° C. as a full grown culture in the above described milk based medium, diluted with sterile 10% glycerol to an end concentration of 6% glycerol. The pre-culture thus obtained was grown for 16 h at 20° C. and was subsequently used to prepare sample F by inoculating the supplemented milk based medium with 1% of the pre-culture and fermenting it until pH 4.3.

Samples C–F were subsequently heated at 80° C. for 1 hour, and subsequent water loss was determined. The results are shown in table 1.

TABLE 1

| Water loss after heating at 80° C. for 1 hour | |
|---|---|
| Sample | water loss (%) at pH 4 |
| C | 10 |
| D | 0 |
| E | 25 |
| F | 60 |

Suitable exopolysaccharide producing starter cultures for use in the preparation of a dairy spread in accordance to the invention can be selected by test (d), measuring water loss upon heating as indicated above. A water loss after heat treatment at pH around 4 of the product of less than 20 wt % is indicative for suitable EPS producing lactic acid bacteria. More preferably there is no significant water loss.

Accordingly samples E and F do not provide suitable cultures for the reduction of graininess in dairy spreads.

This example indicates that *Lactobacillus delbrueckii* subsp. *bulgaricus* 291 and *Lactobacillus helveticus* NCDO 766 may be suitable cultures to reduce graininess in dairy spreads.

When combining this result with the test result described in example II, it can be concluded that *Lactobacillus delbrueckii* subsp. *bulgaricus* 291 and *Lactobacillus helveticus* NCDO 766 are suitable cultures to reduce graininess in dairy spreads.

Example IV

Raw milk is pasteurised for 15 minutes at 90° C. Two fresh cheeses were further prepared according to the general procedures. Fresh cheese G (according to the invention) was prepared by using the thermopyllic cultures *Lactobacillus delbrueckii* subsp. *bulgaricus* 291 and *Streptococcus thermophilus* filant in a one to one ratio. Fresh cheese H (comparison) was prepared by using a mesophyllic Flora Danica culture (ex Chr. Hansen's).

According to test (a) indicated in the description, the products were tasted to assess their graininess. Product G had a significantly reduced graininess as compared to product H.

Example V

The helos particle size was measured as follows: Circa 0.5 g fresh cheese was dispersed in circa 25 ml water. The suspension was stirred for 20 minutes. The Helos/SUCELL was brought to an optical concentration between 15 and 20%. The measuring time was 10 s and the focal length 200 mm, the time resolution 1000 ms.

Two fresh cheeses G and H were prepared according to the process of example IV. The volume distribution of the particle size is shown in FIG. 2.

According to test (b) as described in the application this example shows that the graininess of the fresh cheese is reduced if the amount of particles with higher size is reduced. Preferably the particle size volume distribution is such that there are less than 7 vol % particles with size greater than 18 μm. FIG. 2 shows that the fresh cheese sample (G), acidified with *Lactobacillus delbrueckii* subsp. *bulgaricus* 291 comprises 5% particles with size higher than 18 μm. This is an indication that said culture may be suitable for reduction of graininess in fresh cheese. When combining this result with the test results from either example II or example III, it can be concluded that said culture is capable of reducing graininess in fresh cheese. The comparison sample H comprises about 9% particles with size higher than 18 μm, which is an indication that this is not a suitable culture to reduce graininess in dairy spreads.

Example VI

Fermented milk samples according to example II/III were prepared: Sterile skimmed milk was fermented with 1 wt % of a culture. Sample C was fermented at 37° C. with *Lactobacillus delbrueckii* subsp. *bulgaricus* 291 to a pH of 3.8. Sample D was fermented at 37° C. with *Lactobacillus helveticus* NCDO 766 to a pH of 3.7. Sample E was fermented at 20° C. with *Lactococcus lactis* supsp. *cremoris* H414 to a pH of 4.2. Sample F was fermented with *Lactobacillus sake* 0-1 at 20° C. to a pH of 4.3.

Example VIA

Isolation and purification of the EPS from the fermentation broth was as follows. Protein was removed from the culture broth by addition of trichloroacetic acid until a concentration of 4% was reached. After gentle mixing the culture was allowed to stand for 30 minutes at room temperature. The culture was centrifuged for 30 minutes at 13000 g and the clear supernatant was collected. The EPS produced was precipitated with 1.5 volumes of cold ethanol. The precipitate was collected, redissolved and dialysed against demineralised water for 2 days at 10° C. The water was refreshed twice a day. The material was then freeze-dried and stored under dry conditions.

Two different methods are used to determine whether the EPS is charged, as described in test (e).

(1). Firstly a solution was made of 0.5 wt % of a positively charged polysaccharide, chitosan, in water between pH 4 and 5. It is important that the chitosan is dissolved totally so that a clear solution results. To this clear solution an equal amount of an 0.5 wt % EPS solution was added. Mixing of the solutions is carried out at room temperature. If a precipitate forms, it can be concluded that the EPS added is charged. If the solution remains clear this is indicative of uncharged EPS, which accordingly indicates that the culture from which it was isolated may be a suitable culture for reducing the graininess in dairy spreads.

(2) Another way to determine whether the EPS is charged is by carrying out electrophoresis in a Zetasizer 3 apparatus ex Malvern. With this method, the electrophoretic mobility of the isolated EPS is measured. An aqueous solution of the isolated, concentrated EPS (0.1 wt %) is brought into the electrophoresis cell. If the measured electrophoretic mobility is substantially zero, the EPS is uncharged.

The above two experiments were carried out for EPS isolated from samples C, D, F. EPS isolated from samples C and D resulted in a clear solution in the above described first experiment (1) and showed no movement in the electric field in the above described second experiment (2). Based on these results it is concluded that EPS produced by *Lactobacillus delbrueckii* subsp. *bulgaricus* 291 and *Lactobacillus helveticus* NCDO 766 is uncharged. The EPS isolated from sample F resulted in formation of a precipitate in the first experiment (1). In experiment (2) it was shown that the EPS from sample F moved towards the positive electrode. From this it can be concluded that the EPS isolated from *Lactobacillus sake* 0-1 is negatively charged.

With reference to test (e) in the description production of uncharged exopolysaccharides is indicative of the capability of the cultures producing the uncharged EPS to reduce the graininess in dairy spreads.

Example VI B

To produce the samples for scanning confocal laser microscopy (CSLM) according to test (f) in the description, the milk samples C–E were fermented to pH 5.5 and subjected to a heat treatment of 5 minutes at 60° C. to stop acidification. Subsequently the heated samples are brought onto CSLM microscopic plates. The protein and bacteria are stained with rhodamine B. The Rhodamine staining was carried out according to general textbook procedures as described for example in Nizo Nieuws 1995, nr 8, p13–15, M. E. Marle and P. Zoon. It is important that the pH of the samples is above the pH of aggregation of the proteins, preferably above 5.5. The samples were studied by CSLM. EPS is not directly visible, as it is not stained, but it shows up as a dark envelope. The microscope used was a BioRad MRC600 Confocal Scanning Laser Microscope.

Figure 3B:
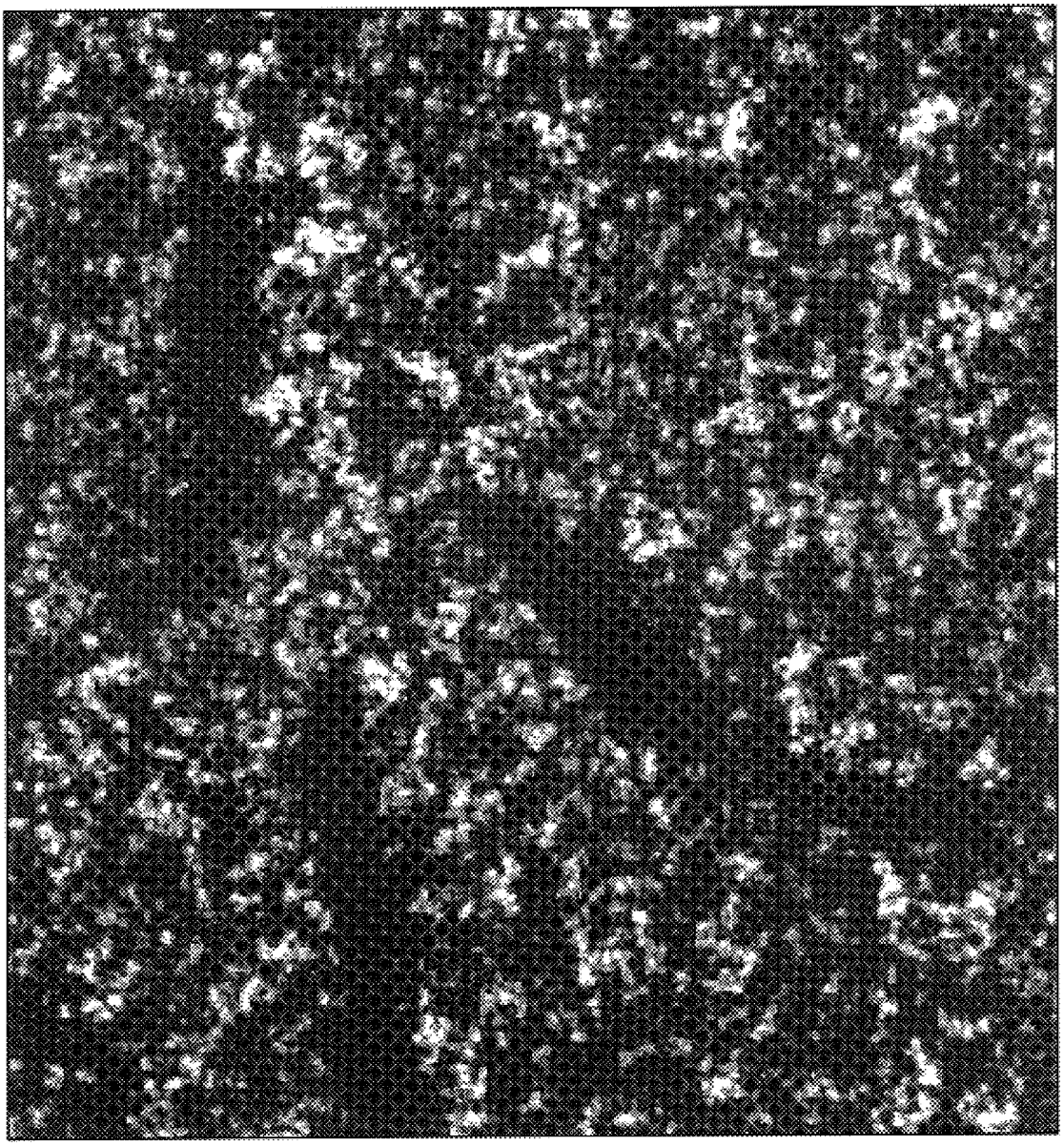
Figure 3C:
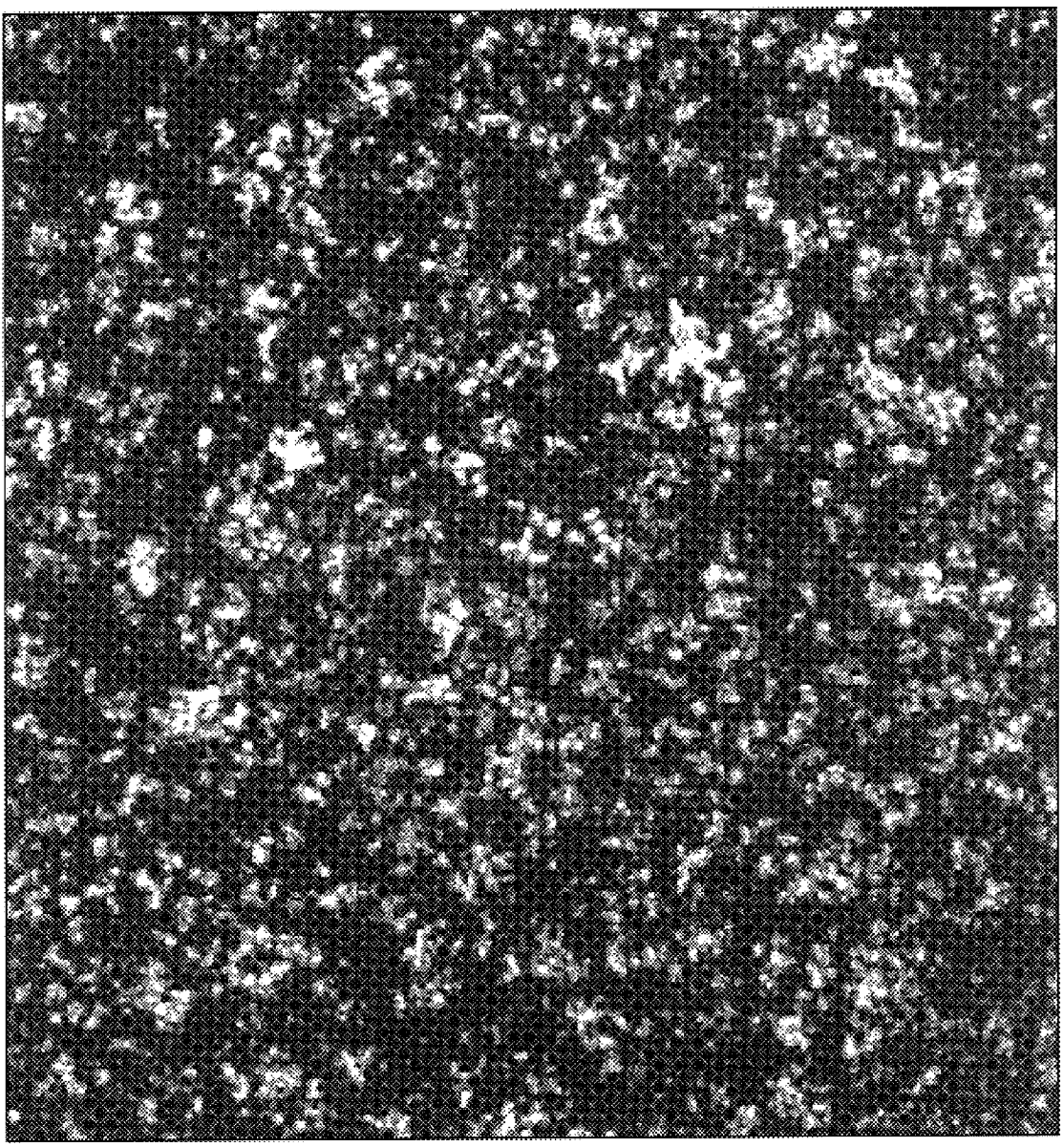

The results are shown in FIGS. 3A–3C. The image width of all pictures is 65 μm.

FIG. 3A refers to *Lactobacillus delbrueckii* subsp. *bulgaricus* 291, FIG. 3B refers to *Lactobacillus helveticus* NCDO 766 and FIG. 3C to *Lactococcus lactis* supsp. *cremoris*H414.

In FIGS. 3A and 3B the EPS is visible as a dark envelope around the bacteria. The protein, stained with Rhodamine B is visible as stained spots. In both FIG. 3A and FIG. 3B it is clearly visible that the EPS forms a layer around the bacteria. In this layer substantially no protein is present. In FIG. 3C no unstained envelopes are present around the bacteria and the EPS is spread all over the area outside the bacteria. Capsules cannot be identified.

From the above results it is concluded that *Lactobacillus delbrueckii* subsp. *bulgaricus* 291 and *Lactobacillus helveticus* NCDO 766 produce capsulating EPS which is indicative of suitable cultures to reduce graininess in dairy spreads. In contrast; *Lactococcus lactis* supsp. *cremoris* H414 produces free EPS which indicates that this is not a suitable culture for products according to the invention.

When combining the results of test (e) and test (f) i.e. examples VIA and VIB, it is concluded that *Lactobacillus delbrueckii* subsp. *bulgaricus* 291 and *Lactobacillus helveticus* NCDO 766 are suitable cultures to reduce graininess in dairy spreads.

What is claimed is:

1. A method of producing a dairy spread having a dry matter content from about 5 to 70 wt. % wherein a cheese, milk, or cream or a combination thereof is heated at 80° C. to 100° C. for 1 to 60 minutes and then acid coagulated in the presence of a bacterial culture and subsequently subjected to a heat treatment, and wherein said culture comprises an exopolysaccharide (EPS) producing lactic acid bacterium capable of reducing the graininess of the dairy spread, the method further comprising the step of homogenizing the dairy spread after acidification.

2. A method according to claim 1, wherein the coagulation is followed by whey separation before or after heat treatment.

3. Method according to claim 1 wherein the fat content of the dairy spread is from 0 to 40 wt % fat and the dry matter content is 15–65 wt %.

4. Method according to claim 1, wherein the dairy spread comprises from 0.1 to 5 wt. % binding and structuring and stabilizing agents selected from the selected from the group consisting of whey protein, locust be an gum, carboxymethyl cellulose, gelatin or mixtures thereof.

5. Method according to claim 1 wherein the acidification process is stopped by applying a heat treatment.

6. Method according to claim 1, wherein the cheese milk or cream or a mixture thereof is heated at 85 to 95° C. for 5 to 20 minutes before acid coagulation.

7. Food product comprising at least 5 wt % of a dairy spread which has been prepared according to claim 1.

8. Food product comprising at least 5 wt % fresh cheese which has been prepared according to claim 1.

9. Food product according to claim 8 comprising at least 90 wt % fresh cheese.

10. The method according to claim 1 wherein the dairy spread is a spreadable butter, yogurt spread, margarine, fresh cheese, cottage cheese, quark or cream cheese.

11. Method according to claim 1, wherein the exopolysaccharide producing culture is selected from the group consisting of *Lactobacillus delbrueckii* supsp. Bulgaricus and *Lactobacillus helveticus* NCDO 766 and mixtures thereof.

* * * * *